June 17, 1958 C. W. JOHNSTONE 2,839,619
PULSE AMPLIFIER
Filed April 5, 1955 6 Sheets-Sheet 1

WITNESSES:
S. Fredrick Larsen
Robert D. Krohn

INVENTOR:
Charles Wilkin Johnstone
BY
Roland A. Anderson
Attorney

June 17, 1958 C. W. JOHNSTONE 2,839,619

PULSE AMPLIFIER

Filed April 5, 1955 6 Sheets-Sheet 2

WITNESSES:

INVENTOR:
Charles Wilkin Johnstone
BY

Attorney

WITNESSES:
A. Frederick Lamm
Robert D. Krohn

INVENTOR:
Charles Wilkin Johnstone
BY
Roland A. Anderson
Attorney

June 17, 1958 C. W. JOHNSTONE 2,839,619

PULSE AMPLIFIER

Filed April 5, 1955 6 Sheets-Sheet 4

WITNESSES:

INVENTOR:

Charles Wilkin Johnstone

BY

Attorney

June 17, 1958 C. W. JOHNSTONE 2,839,619

PULSE AMPLIFIER

Filed April 5, 1955 6 Sheets-Sheet 5

WITNESSES:

INVENTOR:

Charles Wilkin Johnstone

BY

Attorney

WITNESSES:
A. Fredrick Lamann
Robert D. Bohn

INVENTOR:
Charles Wilkin Johnstone
BY
Roland A. Anderson
Attorney

United States Patent Office 2,839,619

Patented June 17, 1958

2,839,619

PULSE AMPLIFIER

Charles Wilkin Johnstone, Los Alamos, N. Mex., assignor to the United States of America as represented by the United States Atomic Energy Commission Application April 5, 1955, Serial No. 499,542

3 Claims. (Cl. 179—171)

The present invention relates generally to new and improved pulse amplifiers and more particularly to improved pulse amplifiers for use with scintillation detectors or counters employing photomultipliers which may generate a wide range of pulse sizes.

Pulse signals from many photomultiplier apparatuses vary greatly in size due to the wide range in energy of the incident particles of gamma rays causing light in the scintillator, and previous pulse amplifiers have not been satisfactory when used to amplify pulse signals from photomultiplier tubes. When such previous amplifiers are overloaded there results harmful distortion, spurious counts and a reduction in available amplifying time of the pulse amplifier, as overloading increases the "dead" time.

The present invention aims to overcome the above and other difficulties or disadvantages by providing a new and improved pulse amplifier which may be utilized with scintillator-photomultiplier tube combinations and overloaded by large pulses without deleterious effect. The invention further provides a means of pulse amplification which does not introduce objectionable base line distortion, with consequent errors in pulse height of small pulses which may follow larger pulses.

An object of the present invention is to provide a pulse amplifier of moderate gain, which is adapted to withstand large overload.

Another object of the invention is to provide a preamplifier adapted to be connected by cable to a pulse amplifier of moderate gain, and adapted to withstand large overload.

Another object of this invention is to provide in combination a linear preamplifier and amplifier of moderate gain adapted to withstand large overload when connected to a photomultiplier circuit.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention and various modifications thereof have been chosen for purposes of illustration and description. The preferred embodiment and the modifications are not intended to be exhaustive nor to limit the invention to the precise forms disclosed. They are chosen and described in order to best explain the principles of the invention and their application in practical use to thereby enable others skilled in the art to best utilize the invention in various embodiments and modifications as are best adapted to the particular use contemplated.

In the accompanying drawings.

Figure 6:
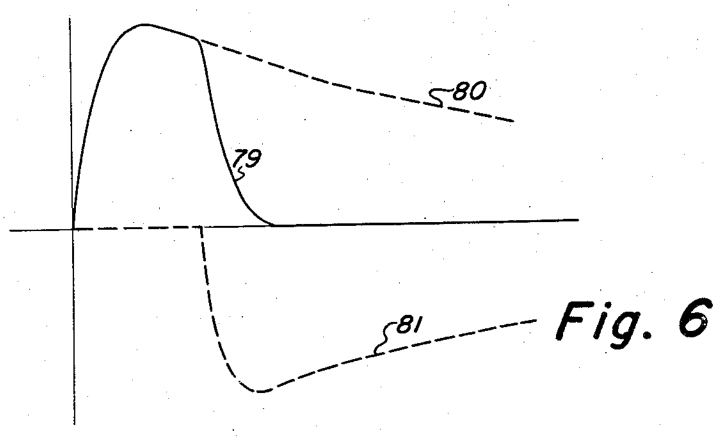
Figure 3:
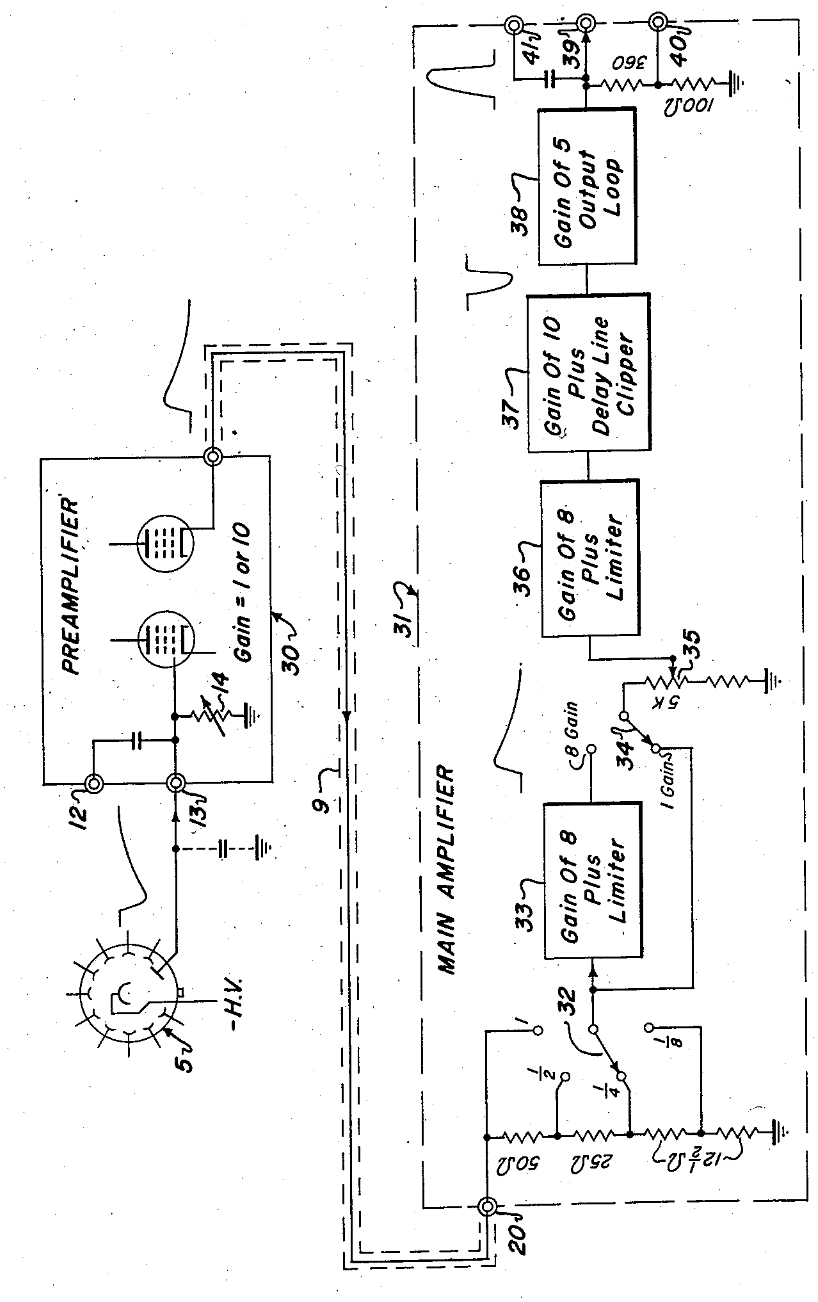
Fig. 3 is a view showing the general arrangement of the present invention, the circuit being separated into blocks or sections and typical pulse wave forms being included at various locations.
Figure 5A:
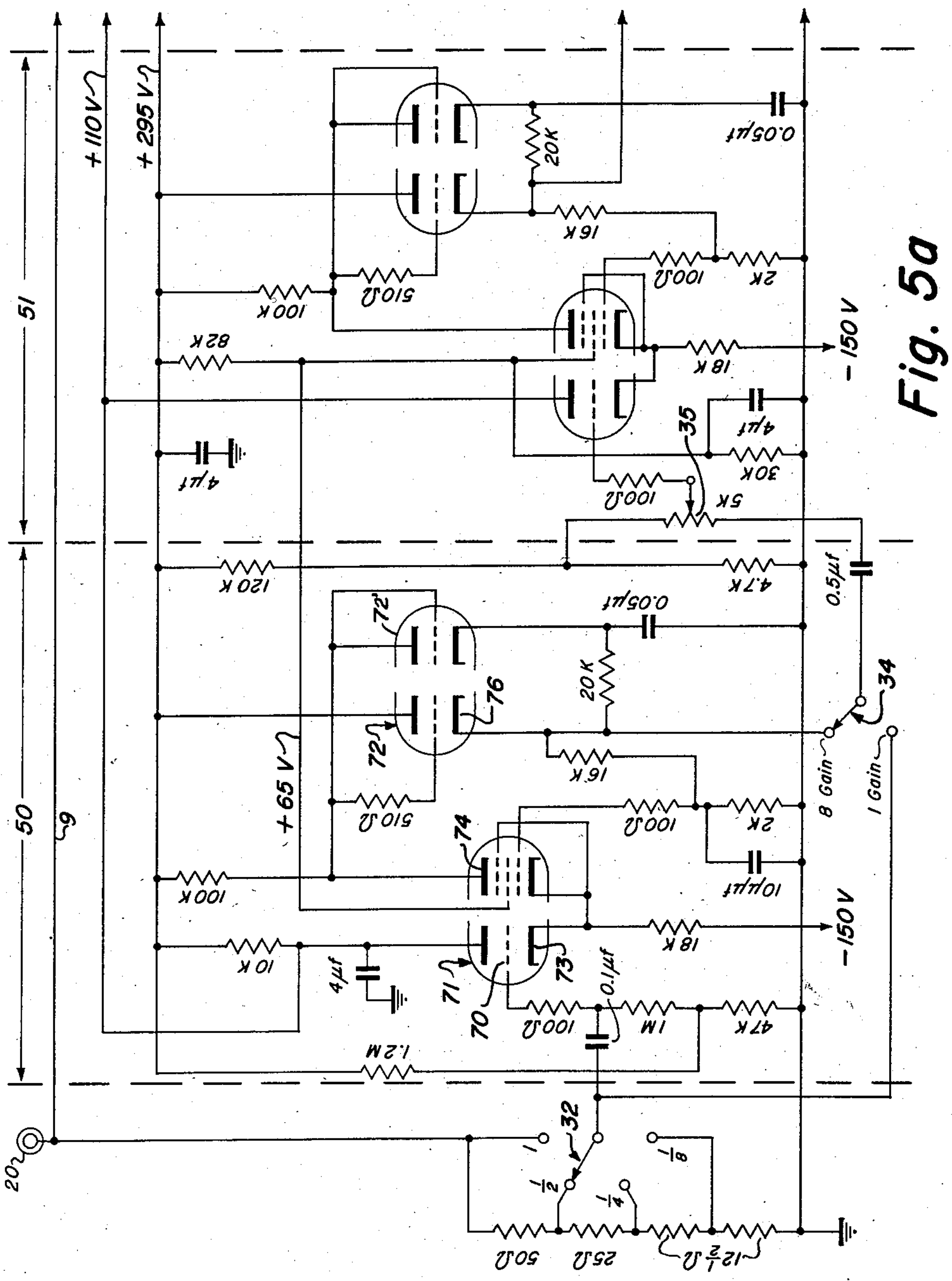
Figure 5B:
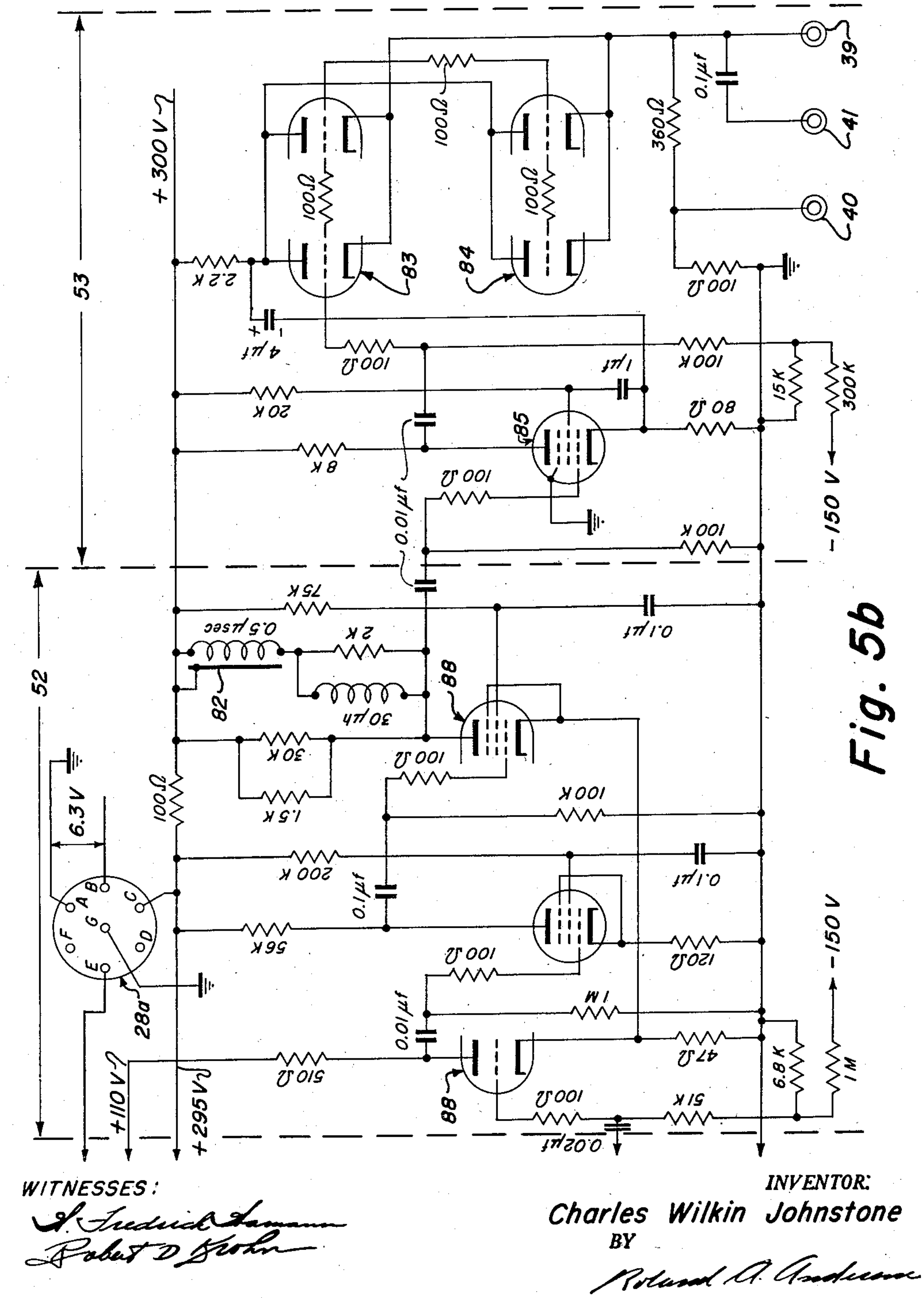
Figure 7:
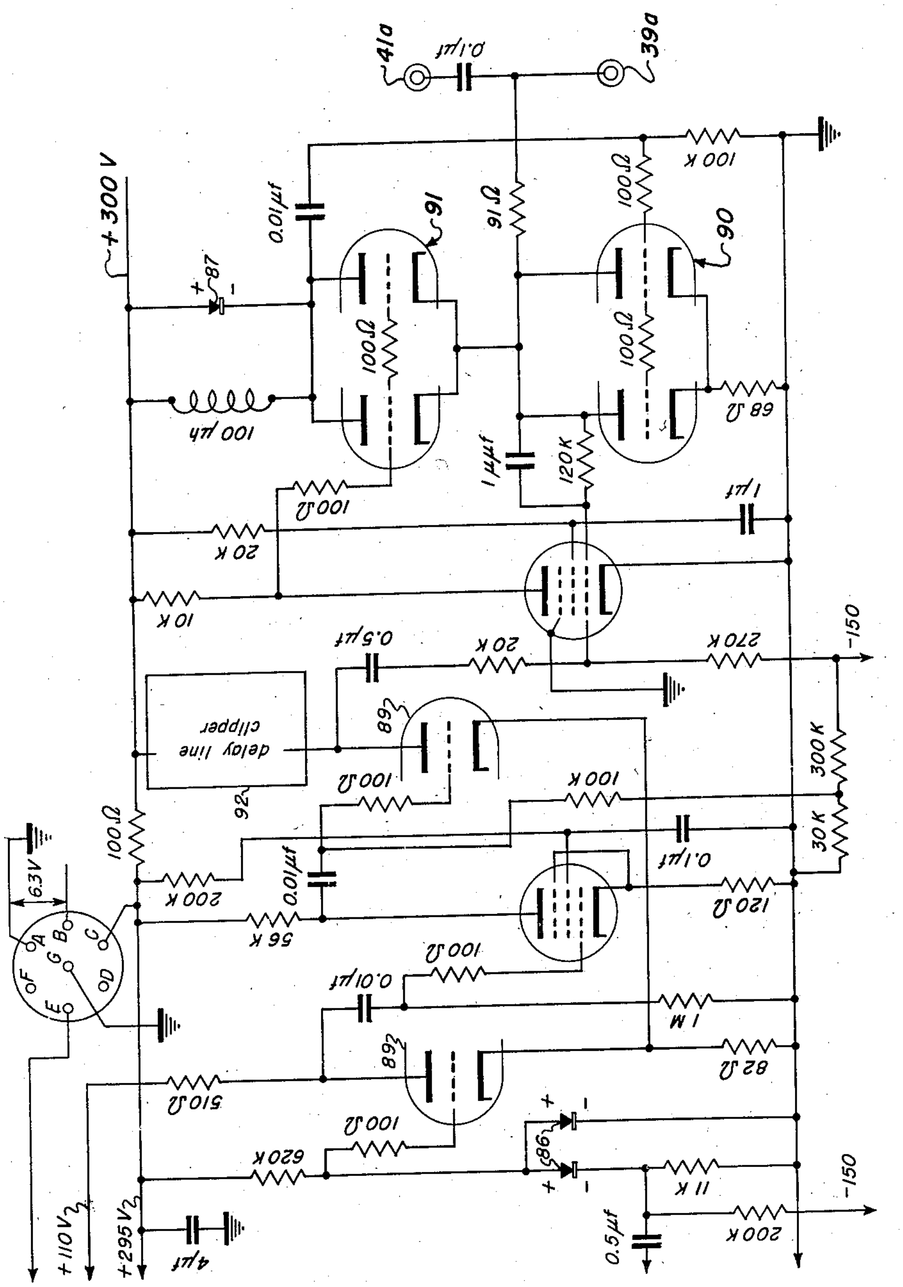

Figs. 5*a* and 5*b* are views showing the main amplifier portion of the invention in greater detail;

Fig. 6 is a chart or set of curves illustrating the action of the delay line clipper of Figs. 3 and 5 in limiting pulse length by cancelling a portion of the pulse; and Figs. 7 is a diagram of a modified form of circuit including delay line clipper means, added crystal limiter and improved output loop.

Scintillating material detectors, e. g., sodium iodide and others, coupled to a photompultiplier tube show a wide energy response and if used in a field of high energy particles as, for example, cosmic rays, pulse size output from the photomultiplier tube will vary over a very wide range corresponding to low and high energy particles incident on the scintillating material. Although high energy cosmic rays may not be wanted in a particular experiment, they nevertheless create pulses and in an ordinary amplifier resultant overloading because of them is so great that deleterious effects occur.

Photomultiplier tubes provide in themselves enormous gain and consequently the subsequent amplifier need not have very high gain, but the amplifier does require stability, linearity, high level output, fast time resolution and good overload characteristics in order to facilitate pulse height analyses and satisfactory discrimination. The feature of good overload characteristics is lacking in previous pulse amplifiers and hence they are not satisfactory for use with scintillation detectors in the field of gamma ray spectroscopy.

Figure 1:
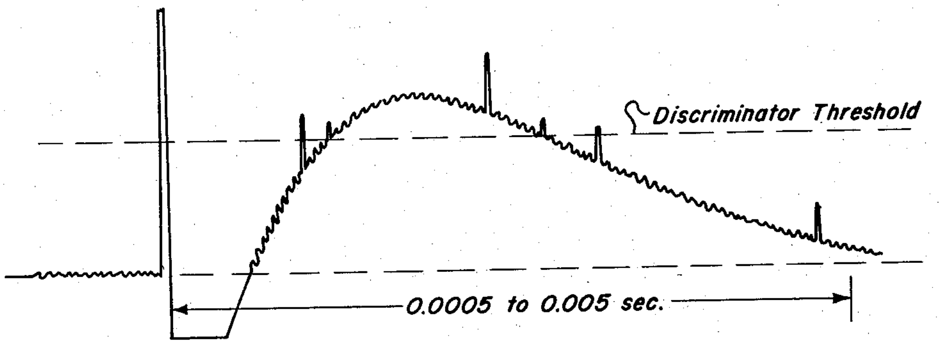
Fig. 1 is a diagrammatic representation showing undesirable base line distortion which may occur in an amplifier that has been overloaded.
Figure 2:
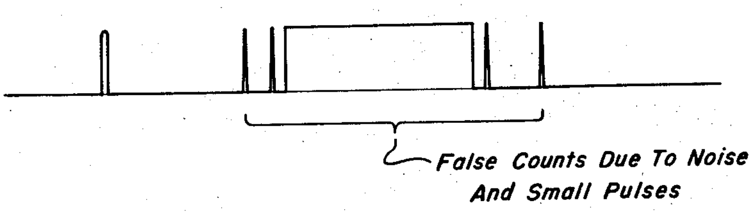
Fig. 2 is a diagrammatic representation showing undesirable discriminator response which may occur as a result of the undesirable base line distortion or shift effects of Fig. 1.

Fig. 1 shows the effect of overloading a conventional pulse amplifier. The base line distortion following a strongly saturated pulse results in undesired counts, and if it occurs frequently, accurate pulse height analysis is impossible. The false counts resulting from this base line distortion are illustrated in Fig. 2. This form of distortion is generally caused when an intermediate stage is driven to excessive grid current and is made worse by utilization of two or more nearly similar interstage coupling time constants. As a further result of base line distortion, time resolution of the amplifier is impaired.

Under conventional practice a delay line clipper is placed at a location near the input of previous amplifiers, but this is objectionable when dealing with overload pulses because base line disturbances which normally follow the delay line clipped pulses can be so greatly magnified by overloading that they will appear as sizeable false pulses at the amplifier output. Delay line clipping also requires the selection of a time constant which, if not quite correct, can cause base line displacement of either polarity. With an "early" clipper, this is likewise magnified following an overload pulse.

The present invention overcomes these and other limitations of previous circuits. The effects of grid currents are made negligible and the delay line clipper is placed unconventionally at a late stage in the amplifier, an advantage in this application.

As shown in the Fig. 3 "block" diagram, photomultiplier tube 5 is connected to input terminal 13 of the preamplifier portion 30 of the apparatus, the output of preamplifier portion 30 is in turn connected by suitable coaxial cable 9 to input terminal 20 of the main amplifier portion 31. The amplifier portion 31 comprises circuit sections or blocks including attenuator means 32, a first gain (gain-of-eight) plus limiter block 33, a gain selector switch 34, a fine gain control 35, a second gain (gain-of-eight) plus limiter block 36, a gain (gain-of-ten) plus delay line clipper block 37, a gain (gain-of-five) and output loop block 38, and suitable output terminals 39, 40 and 41. The output terminals may connect with any suitable observing, counting or recording equipment (not shown).

In addition to the photomultiplier tube input terminal 13 of the preamplifier portion 30, there is preferably provided an auxiliary input terminal 12 for connection with an external pulser (not shown) for purposes of checking the operation of the combined preamplifier and amplifier portions.

The preamplifier comprises two tubes, 10 and 11, connected to form a loop which employs negative current feedback. The preamplifier inverts the polarity of the input pulses and acts to isolate the high impedance input circuit from the low impedance, terminated, coaxial cable 9, which conducts the pulses to the main amplifier portion. The gain of the preamplifier is determined by the ratio of the cathode resistor of tube 11 (100 ohms located at the main amplifier end of cable 9) to the cathode resistor of tube 10. Essentially all the signal current which flows through tube 11 into the 100 ohm cable termination is fed back to the cathode resistor at tube 10 through the 4 mfd. coupling capacitor which is connected between plate 22 of tube 11 and cathode 19 of tube 10. Gain switch 15 permits the choice of either cathode resistor 25 (100 ohms) alone, in which case the preamplifier gain is approximately unity, or resistor 16 in parallel with resistor 25 to provide a gain of approximately 10. Photomultiplier pulses may be sufficiently large so that a preamplifier gain of unity is satisfactory. Tube 11 may be a high transconductance type such as a 417–A.

If input signals are large enough to overdrive the preamplifier, grid current will flow in the cathode follower stage which includes tube 11, but the base line displacement that results is made small by the use of a large coupling condenser 26 and a large plate resistor 27 of tube 10. In addition, the negative feed-back from plate or anode 22 of tube 11 to cathode 19 of tube 10 assists in this regard. As a result, overload factors of ten at the preamplifier contribute only two to three volts of base line displacement at the output of the main amplifier, using full gain; such extreme overloadings, however, are rare and can often be prevented by adding more input capacity to reduce the input signals.

The preamplifier 30 may be supplied voltage by cable connections to the main amplifier through connector plug 28. Terminals A and B may furnish 6.3 volt supply to filaments 23 and 24, of the tubes 10 and 11; terminal C may furnish 295 volt plate supply for the two tubes; terminal E transfers the output of the preamplifier portion 30 to the amplifier portion 31, and terminal G is grounded to the cable sheath and to the preamplifier ground.

Within the main amplifier portion 31 as shown in Fig. 5*a* and 5*b* the output from preamplifier portion 30 is impressed (via coaxial cable 9, through terminal E of connector plug 28*a* to attenuator 32) across attenuator 32, which has a total of 100 ohms impedance and is suitably tapped so that one-eighth, one-fourth, one-half, or all of the voltage impressed thereon may be placed on grid 70 of tube 71. For clarity of description broken lines have been applied to the circuit diagram of Figs. 5*a* and 5*b* to divide it into portions corresponding generally to the "blocks" of Fig. 3.

Figure 4:
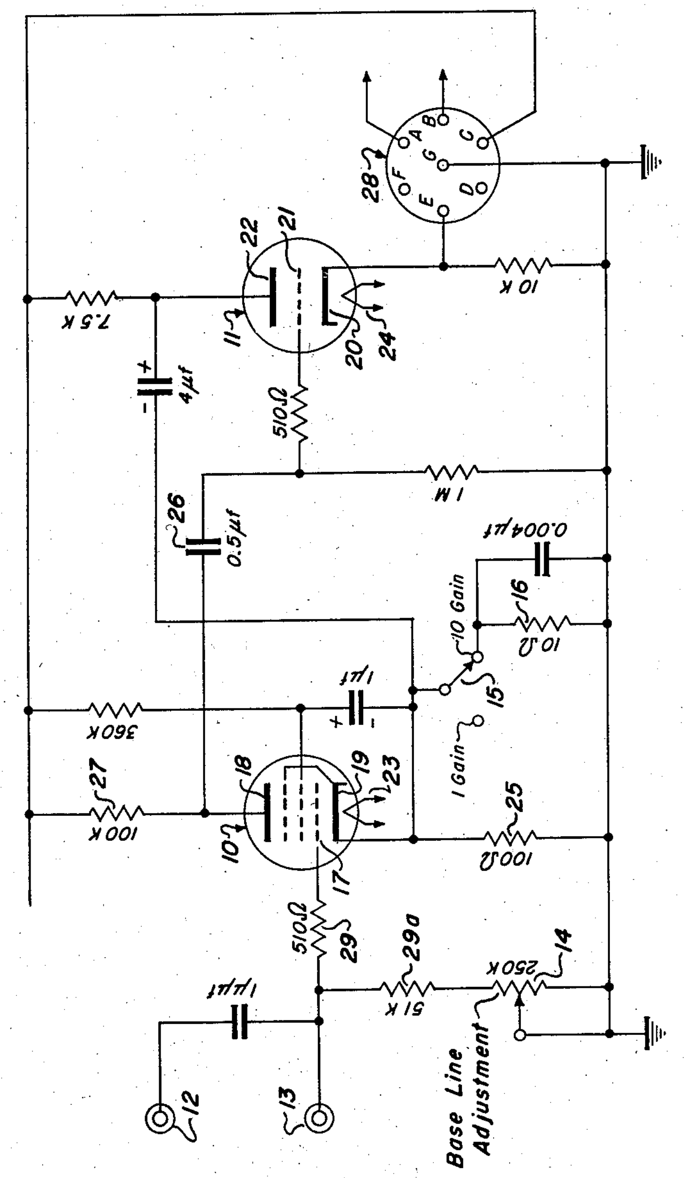
Fig. 4 is a view showing the preamplifier portion of the present invention in greater detail.

Referring more particularly to Fig. 4, which shows circuitry for negative pulse input, input terminal 13 connects directly with, and auxiliary input terminal 12 is condenser-coupled to resistor 29 and grid 17 of tube 10, which may be of the 6AK5 type. Auxiliary input terminal 12 is coupled through a very small capacitor so as not to disturb the high impedance anode circuit of the photomultiplier tube. An adjustable potentiometer 14 in series with a resistor 29*a* connects input terminal 13 to ground and facilitates adjusting the shape of the photomultiplier tube pulse with particular respect to the "tail" of the pulse curve, as will be hereinafter referred to.

For clarity of illustration the usual filaments or heaters and their connections are omitted from the various tubes of amplifier portion 31 but it should be understood that the tubes will include them and their connections with a power supply, e. g., terminals AB of a connector plug 28*a*, similarly to those disclosed in connection with preamplifier portion 30.

Tube 71 of the first gain-of-eight section 50 may be a triode-pentode of the 6×8 type, or if tube economy is not required, a separate triode and a separate pentode could be used. Likewise, tube 72 may be a duo-triode of the 6BQ7–A type, but separate triodes or a separate triode and separate diode may be used. An input pulse, when impressed on attentuator 32 and subsequently grid 70 of tube 71, causes cathode 73 of tube 71 to vary with grid potential as tube 71 is operated as a cathode follower. This affects the plate 74 of the pentode side of tube 71 which then follows variations in grid 70. The pentode section of tube 71 in combination with the left hand triode of tube 72 forms the gain lop of section 50. The output signal of this gain loop appears at cathode 76 of tube 72. The 16K and 2K resistors between cathode 76 and ground comprise a feedback network to supply negative voltage feedback to the grid of the pentode section of tube 71. The gain of section 50 is slightly less than the ratio of the sum of the 16K and 2K resistors to the 2K resistor, i. e., 18K/2K. As the plate potential of plate 74 rises, the potential is applied to the plate of the right half 72′ of duo-triode 72 which is connected as a diode. The cathode of this diode is biased at 3 or 4 volts from cathode 76 of the left section of tube 72. Thus, when the plate potential of the pentode section of tube 71 reaches the conduction potential of the diode, the plate of tube 71 pentode section is prevented from rising further. This effects a limiting action to avoid overdriving the next gain section. Selection switch 34 serves to connect the following loop 51 to either cathode 76 of tube 72 or to attenuator 32 so that the first gain of 8, 50 may be either included or bypassed. Thus switch 34 provides a coarse gain control for the amplifier.

Following the first gain-of-eight section 50 is a similar second gain-of-eight section 51, which may not be bypassed. The fine gain control 35 previously referred to is shown as part and in advance of circuit section 51 and comprises a potentiometer which may be adjusted as desired and which, with switches 32 and 34 provides for gain adjustment of the main amplifier portion over a wide range.

It can be seen, then, that sections 50 and 51 each provide a gain-of-eight and that each has its own limiter to avoid overdriving its following section.

In amplifiers of the type of this invention it is most desirable to employ a delay line clipper to shape the pulse and limit the length thereof. As hereinbefore referred to, the conventional location for a delay line clipper is at an "early" position in an amplifier. This leads to disadvantages, when overload pulses are encountered, but in previous amplifiers, where early stages could not be overloaded without deleterious effects, there was no advantage in placing the clipper at a "late" position.

In the amplifier of this invention the delay line clipper 82 (section 52 of Fig. 5*b*) is, unconventionally, placed at a "late" position, with highly improved results. In the operation of the clipper, a pulse passes down the delay line and is reflected back from the shorted end in opposite phase. If the reflected pulse is of the correct amplitude it cancels the balance of the original pulse. The width of the pulse which remains is then equal to the time it takes for the original pulse to pass down the delay line and back, which may be of the order of one microsecond. With reference to Fig. 6, for example, the later portion of the original pulse 80 is cancelled by the pulse return 81 from the delay line clipper leaving the desired portion 79 of the original pulse. A delay line clipper has some attenuation within it simply because it cannot be built with zero losses. In order to properly cancel curve 80, the height of 80 must fall during the time the leading edge of the pulse is in the delay line, so that when the attenuated pulse comes back out of the delay line the original pulse 80 will have been "effectively attenuated" to the same height value. In the present amplifier this "effective attenuation" is accomplished in the preamplifier portion 30 (Fig. 4) by potentiometer 14, which adjusts the rate of decay, so that the resulting pulse may be as represented by the curve 79. Section 52 comprises the delay line clipper, with the delay line 82, such as a section of commercially available helical delay cable, connected in somewhat conventional fashion, but with the entire section 52 located in a position relative to the amplifier input not customary in previous amplifiers.

With further reference to section 52 of Fig. 5*b*, tube 88, which is shown separated for clarity of illustration and which may be of 6×8 type or similar, should be such that its pentode portion is capable of delivering at least 30 milliamps to provide good linearity up to 100 volts amplifier output. The other tube of this section may be of the 6AH6 type. The gain of approximately 10 of section 52 is primarily determined by the ratio of the impedance of the plate load of the pentode section of tube 88 to the cathode resistor of tube 88. The plate impedance is approximately 650 ohms and the cathode resistance is 47 ohms; however, a correction must be made to this ratio (650/47=14) because the screen current is included in the feedback current. Therefore the actual gain is lower than the said ratio by a factor determined from the ratio of plate current to the sum of the plate and screen currents. This results in an overall gain for loop 52 of about 10.

Output section 53 (Fig. 5*b*) has an amplification factor of five. It is a loop employing negative current feedback similar to the preamplifier section (Fig. 4). In order to obtain large output currents, the output cathode follower comprises a total of four triode sections connected in parallel. These four triode sections are duotriode tubes 83 and 84 and may be of the 5687 type or, of course, if tube economy is not important, four separate triodes may be used. Several optional output connections or terminals are provided to meet the needs of the various circuitry that might be used following this amplifier. Terminal 40 is a low level output and terminals 41 and 39 are high level outputs, the former (41) being capacity connected to the cathodes of tubes 83 and 84 and the latter (39) being directly connected to said cathodes. Capacity output terminal 41 may be connected, for example, with an oscilloscope, and output terminals 39 and 40 may be selectively connected with any suitable discriminator and counter circuits. The gain of 5 of section 53 is approximately determined by the ratio of the cathode load resistance of tubes 83 and 84 (100 ohms plus 360 ohms) to the cathode resistor of tube 85 (80 ohms).

The following characteristics of the amplifier of the present invention are indicative of the superiority of the amplifier:

| | |
|---|---|
| Maximum voltage gain with preamplifier | 32,000. |
| Minimum voltage gain with preamplifier | 25. |
| Acceptable overload factor | 1,000. |
| Linearity (10–100 volts output) | 1%. |
| All sections have adequate negative feedback. | |
| Gain stability | Excellent. |
| Output pulse rise time (10–90%) | 0.25 to 0.33 μsec. |
| Nominal output pulse width or duration | 1 μsec. |

In Fig. 7 there is shown a modified form of a portion of the device, which may be substituted for sections 52 and 53 (Fig. 5*b*). This circuitry eliminates the triode-pentode tube 88 and employs a double triode 89 such as a 5687 tube to drive the delay line with current to spare. An additional limiter employing germanium diodes 86 is included, for more effective limiting of the amplifier output pulses at a voltage level close to the maximum linear output level.

In the output loop the same tubes are used as described in connection with section 53, but voltage feedback instead of current feedback is employed to reduce the output impedance so that up to thirty feet of cable, such as RG 71μ type, may be connected to the output of the amplifier without noting any objectionable distortion.

Tube 90, a duo-triode is connected to the cathodes of another duo-triode 91, in the manner of a "stacked" cathode follower, well known in the art, so that tube 90 is a variable cathode impedance to tube 91, by virtue of the signal developed at the plates of tube 91 across the inductor and germanium diode 87 which is coupled to the grids of tube 90. This is a very effective circuit for driving a large capacitive load without wasting a major portion of the output tube pulse current in a fixed cathode load.

Preferred embodiments of the present invention have been described, but it should be understood that various changes can be made without affecting the basic tenets of the circuitry. For example in photomultiplier-scintillation or other counting systems, it is very often desirable to connect two or more preamplifiers in parallel, each to a separate detector, but all to a common amplifier. The design of this preamplifier has considered this requirement and it is possible to connect two or more preamplifiers in parallel without involved networks or other circuit changes.

Furthermore, it is recognized that the delay line clipper could be placed "earlier" in the circuits but at disadvantage to the operation in the preferred embodiment. It is further understood that the gains of each of the described different sections of the amplifier and preamplifier are representative and indicate orders of magnitude which make the amplifier operative for the preferred embodiment. Any one of several conventional delay lines may be used as well as other conventional delay line circuits.

As various changes may be made in the form, construction and arrangement of the parts herein without sacrificing any of its advantages, it is to be understood that all matter herein is to be interpreted as illustrative and not in a limiting sense.

I claim:

1. A non-overloading pulse amplifier comprising first and second amplifier tubes each having at least a cathode, a control electrode and an anode, a cathode follower having at least a cathode, a control electrode and an anode and a diode having a cathode and an anode; said amplifier tubes being cathode coupled by a common load resistor, means for coupling the anode of the second amplifier tube to the control electrode of the cathode follower, means for coupling the cathode of the cathode follower to an output terminal and to the control electrode of the second amplifier tube, means for coupling the inter-electrode space of said diode in shunt with the grid-cathode space of the cathode follower, and means for impressing input pulses on the control electrode of the first amplifier tube.

2. A non-overloading pulse amplifier comprising first and second amplifier tubes each having a cathode, a control electrode and an anode, a cathode follower having at least a cathode, a control electrode and an anode, and a limiter diode having at least a cathode and an anode; said first amplifier tube being cathode coupled to the second amplifier tube, an anode load resistor being coupled between the second amplifier tube anode and a source of anode potential, resistor coupling means connecting the anode of the second amplifier tube to the grid of the cathode follower tube and to the anode of the limiter diode, resistor coupling means connecting the cathode of the cathode follower tube and the control grid of the second amplifier tube, and resistance coupling means connecting the cathode of the limiter diode and the cathode of the cathode follower tube, and signal input means connected to the control electrode of the first amplifier tube and an anode load resistor connecting the anode to the source of anode potential.

3. A non-overloading pulse amplifier circuit comprising first and second amplifier tubes, a cathode follower tube and a diode; each of said first and second amplifier tubes and said cathode follower tube having at least a cathode, a control grid and an anode and said diode having at least a cathode and an anode; pulse signal input means connected to the grid of the first amplifier tube, the first and second amplifier tube being coupled by a common cathode load resistor, respective load resistors connecting the anodes of the first and second amplifier tube to a source of anode potential; direct current coupling means connecting the anode of the second amplifier tube to the control grid of the cathode follower and to the anode of the diode; direct current coupling means connecting the cathode of the cathode follower to the control grid of the second amplifier tube and direct current coupling means connecting the diode cathode to the cathode follower cathode, whereby the plate swing of the second amplifier tube is limited by the diode to a value of voltage corresponding to the control grid-cathode differential voltage of the cathode follower; and output terminal means connected to the cathode of the cathode follower.

References Cited in the file of this patent

UNITED STATES PATENTS

| | | |
|---|---|---|
| 2,500,756 | Kerns | Mar. 14, 1950 |
| 2,538,488 | Volkers | Jan. 16, 1951 |
| 2,617,946 | Weller | Nov. 11, 1952 |
| 2,686,266 | Pringle et al. | Aug. 10, 1954 |
| 2,712,081 | Fearon et al. | June 28, 1955 |
| 2,740,835 | Genaust | Apr. 3, 1956 |